US009265049B2

(12) United States Patent
Palanki et al.

(10) Patent No.: US 9,265,049 B2
(45) Date of Patent: Feb. 16, 2016

(54) METHOD AND APPARATUS FOR USING UPLINK CONTROL INFORMATION FOR INTER-CELL DECODING AND INTERFERENCE CANCELLATION

(75) Inventors: Ravi Palanki, San Diego, CA (US); Alexei Y. Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 12/498,468

(22) Filed: Jul. 7, 2009

(65) Prior Publication Data

US 2010/0008294 A1 Jan. 14, 2010

Related U.S. Application Data

(60) Provisional application No. 61/080,065, filed on Jul. 11, 2008.

(51) Int. Cl.
*H04W 72/08* (2009.01)
*H04W 48/08* (2009.01)
*H04W 72/04* (2009.01)
*H04B 7/02* (2006.01)

(52) U.S. Cl.
CPC .............. *H04W 72/082* (2013.01); *H04B 7/022* (2013.01); *H04B 2201/70702* (2013.01); *H04W 48/08* (2013.01); *H04W 72/0406* (2013.01)

(58) Field of Classification Search
CPC .................... H04B 7/022; H04B 2201/70702; H04W 72/082; H04W 48/08; H04W 72/0406; H04W 28/04; H04W 52/143; H04W 52/244; H04W 52/22
See application file for complete search history.

(56) References Cited

U.S. PATENT DOCUMENTS 7,254,197 B2 8/2007 Heo et al.
7,421,041 B2 9/2008 Khandekar et al.
(Continued)

FOREIGN PATENT DOCUMENTS

EP 1523112 A1 4/2005
JP 10500811 1/1998
(Continued)

OTHER PUBLICATIONS

3GPP Draft; 25814-150, 3rd Generation Partnership Project (3GPP), Mobile Competence Centre ; 650, Route Des Lucioles ; F-06921 Sophia-Antipolis Cedex ; France, vol. RAN WG1, no. Shanghai, China; May 26, 2006, XP050102001 pp. 29-30 p. 76 pp. 89-90.
(Continued)

*Primary Examiner* — Yee Lam

(57) ABSTRACT

Techniques for supporting data transmission on the uplink in a wireless network are described. In an aspect, a user equipment (UE) may send a data transmission to a serving base station and may send uplink control information (UCI) to a non-serving base station. The UCI may include pertinent information to allow the non-serving base station to process the data transmission from the UE. In one design, the UCI may allow the non-serving base station to estimate the interference due to the data transmission from the UE and to cancel the interference at the non-serving base station. The interference cancellation may improve the received signal quality at the non-serving base station. After the interference cancellation, the non-serving base station may process a data transmission from another UE served by the base station.

40 Claims, 7 Drawing Sheets

(56) References Cited

U.S. PATENT DOCUMENTS

| | | | |
|---|---|---|---|
| 2004/0192208 A1* | 9/2004 | Kong et al. | 455/63.1 |
| 2005/0271012 A1* | 12/2005 | Agrawal et al. | 370/331 |
| 2006/0003767 A1* | 1/2006 | Kim et al. | 455/436 |
| 2006/0126703 A1* | 6/2006 | Karna | 375/147 |
| 2006/0286996 A1* | 12/2006 | Julian et al. | 455/522 |
| 2007/0135125 A1* | 6/2007 | Kim et al. | 455/436 |
| 2007/0207812 A1 | 9/2007 | Borran et al. | |
| 2007/0248052 A1* | 10/2007 | Nagaraj et al. | 370/331 |
| 2008/0025265 A1* | 1/2008 | Soong et al. | 370/335 |
| 2008/0212542 A1* | 9/2008 | Kung et al. | 370/336 |
| 2008/0232326 A1* | 9/2008 | Lindoff et al. | 370/332 |
| 2008/0253318 A1* | 10/2008 | Malladi et al. | 370/328 |
| 2009/0180561 A1* | 7/2009 | Kim et al. | 375/260 |
| 2009/0275337 A1* | 11/2009 | Maeda et al. | 455/442 |
| 2009/0305741 A1* | 12/2009 | Takeuchi et al. | 455/561 |
| 2009/0323777 A1* | 12/2009 | Wang et al. | 375/148 |
| 2010/0118796 A1* | 5/2010 | Yi et al. | 370/329 |
| 2010/0246825 A1* | 9/2010 | Baras et al. | 380/270 |
| 2010/0271970 A1* | 10/2010 | Pan et al. | 370/252 |
| 2012/0093093 A1* | 4/2012 | Frenger et al. | 370/329 |

FOREIGN PATENT DOCUMENTS

| | | |
|---|---|---|
| JP | 2007514367 A | 5/2007 |
| JP | 2009534927 A | 9/2009 |
| RU | 2322762 C1 | 4/2008 |
| RU | 2323525 C2 | 4/2008 |
| WO | WO-9526593 | 10/1995 |
| WO | WO2004079975 | 9/2004 |
| WO | 2005032001 A1 | 4/2005 |
| WO | WO-2005057975 A1 | 6/2005 |
| WO | WO-2007127098 A1 | 11/2007 |

OTHER PUBLICATIONS

China Mobile: "Enhancement of Uplink Macro Diversity Combining in Flat Evolved HSPA Architecture" 3GPP Draft; R3-071207, 3rd Generation Partnership Project (3GPP), Mobile Competence Centre; 650, Route Des Lucioles ; F-06921 Sophia-Antipolis Cedex; France, vol. RAN WG3, no. Kobe, Japan; May 14, 2007, XP050162068 [retrieved on May 14, 2007] pp. 1-2; figure 1.

International Search Report and Written Opinion—PCT/US2009/050304, International Search Authority—European Patent Office—Mar. 5, 2010.

LG Electronics: "TFC signaling for E-DCH to support macro-diversity" 3GPP Draft; R1-031053, 3rd Generation Partnership Project (3GPP), Mobile Competence Centre ; 650, Route Des Lucioles; F-06921 Sophia-Antipolis Cedex; France, vol. RAN WG1, no. Seoul, Korea; Oct. 3, 2003, XP050098130 [retrieved on Oct. 3, 2003] pp. 1-2.

Qualcomm Europe: "UTRAN enhancements for the support of inter-cell interference cancellation" 3GPP Draft; R3-080069 UTRAN Enhancements for the Support of Inter-Cell Interference Cancellation, 3rd Generation Partnership Project (3GPP), Mobile Competence Centre ; 650, Route Des Lucioles ; F-06921 Sophia-Antipolis Cedex ; France, vol . RAN WG1, no. Shenzhen, China; Mar. 19, 2008, XP050110087.

Ritt, et al., "TP on uplink inter-cell interference cancellation" 3GPP Draft; R1-060418, 3rd Generation Partnership Project (3GPP), Mobile Competence Centre ; 650, Route Des Lucioles ; F-06921 Sophia-Antipolis Cedex ; France, vol . RAN WG1, no. Denver, USA; Feb. 9, 2006, XP050101362 [retrieved on Feb. 9, 2006] the whole document.

Smee, John E., et al., "Receiver Architectures and Design Tradeoffs for CDMA Interference Cancellation" Signals, Systems and Computers, 2006. ACSSC '06. Fortieth Asiloma R Conference on, IEEE, PI, Oct. 1, 2006, pp. 2167-2171, XP031081409 ISBN: 978-1-4244-0784-2 p. 2168; figures 1, 2.

TSG-RAN: "3GPP TS 25.213 V7.4.0 Spreading and modulation (FDD) (Release 7)" Dec. 1, 2007, XP002569182 Retrieved from the Internet: URL:www.3gpp.org> [retrieved on Apr. 16, 2009] p. 9-p. 11.

Taiwan Search Report—TW098123444—TIPO—Aug. 22, 2012.

* cited by examiner

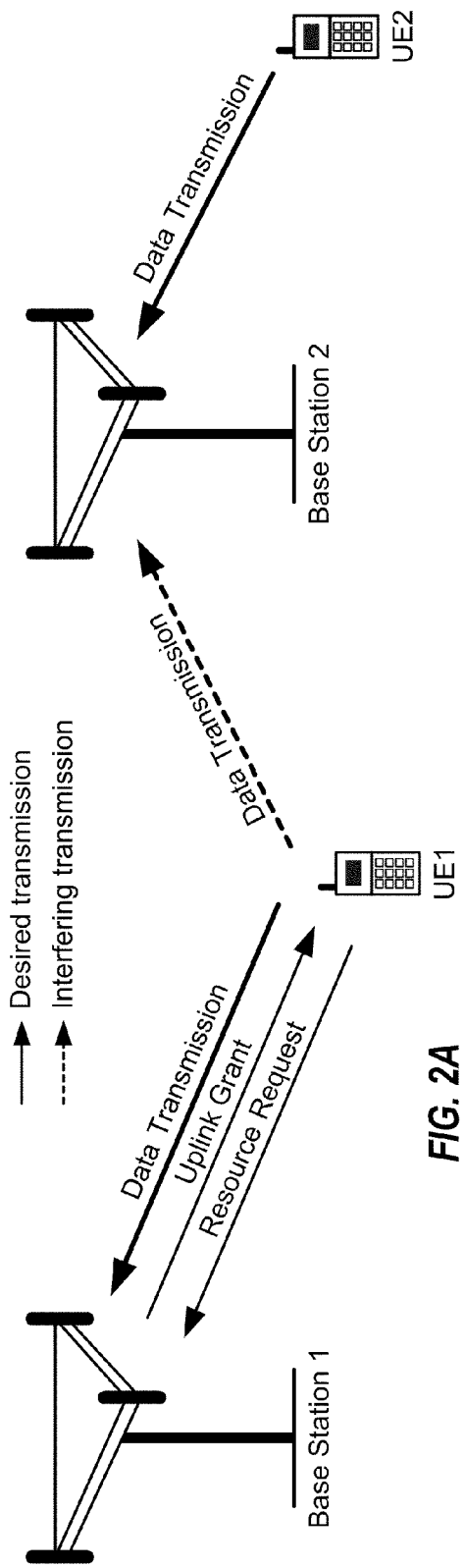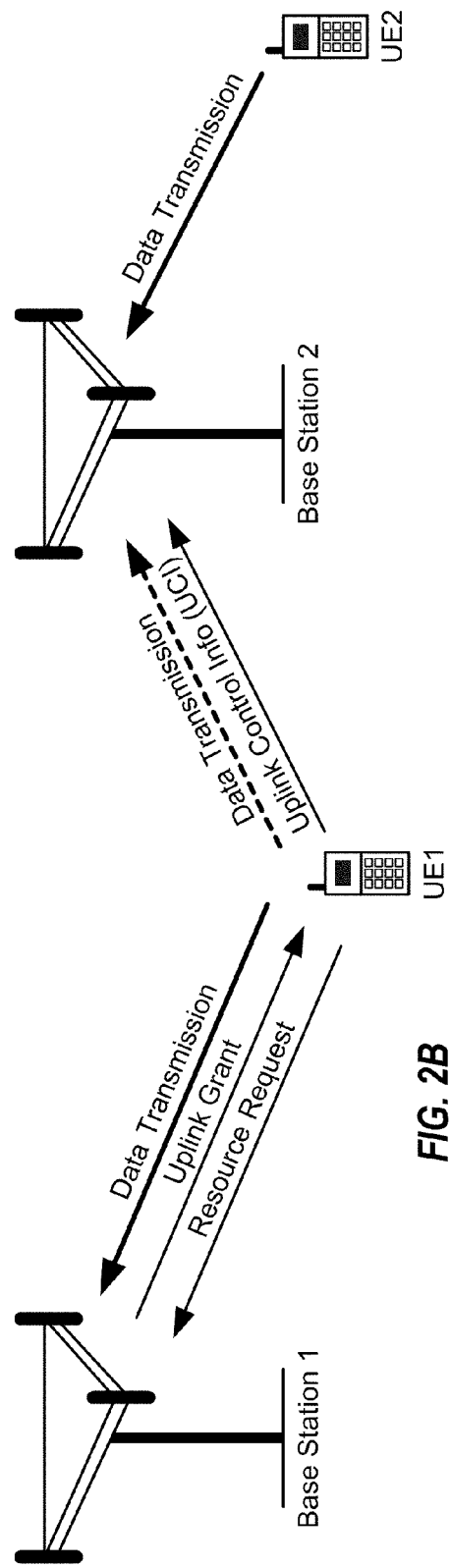
FIG. 2A
FIG. 2B

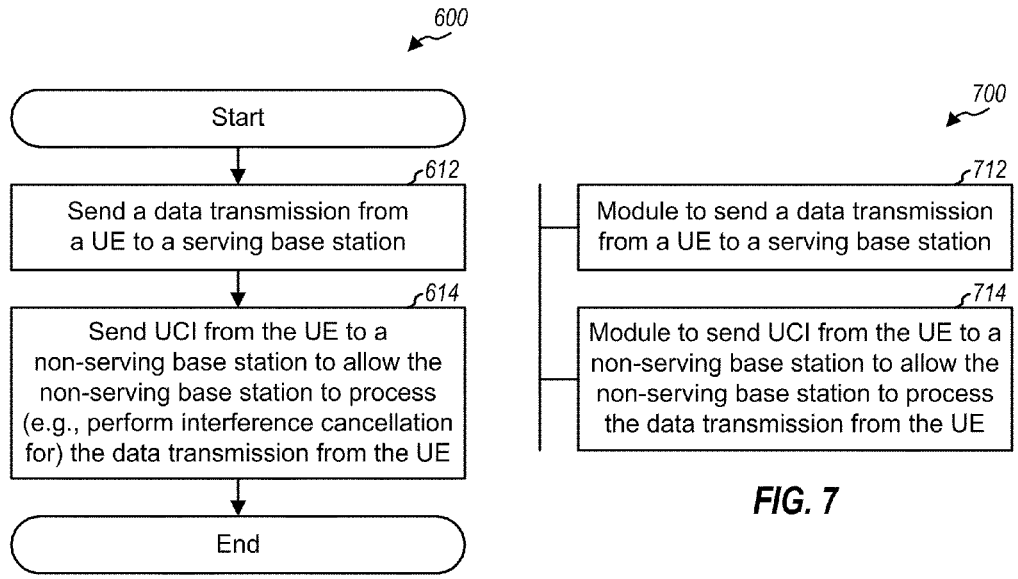
FIG. 6
FIG. 7
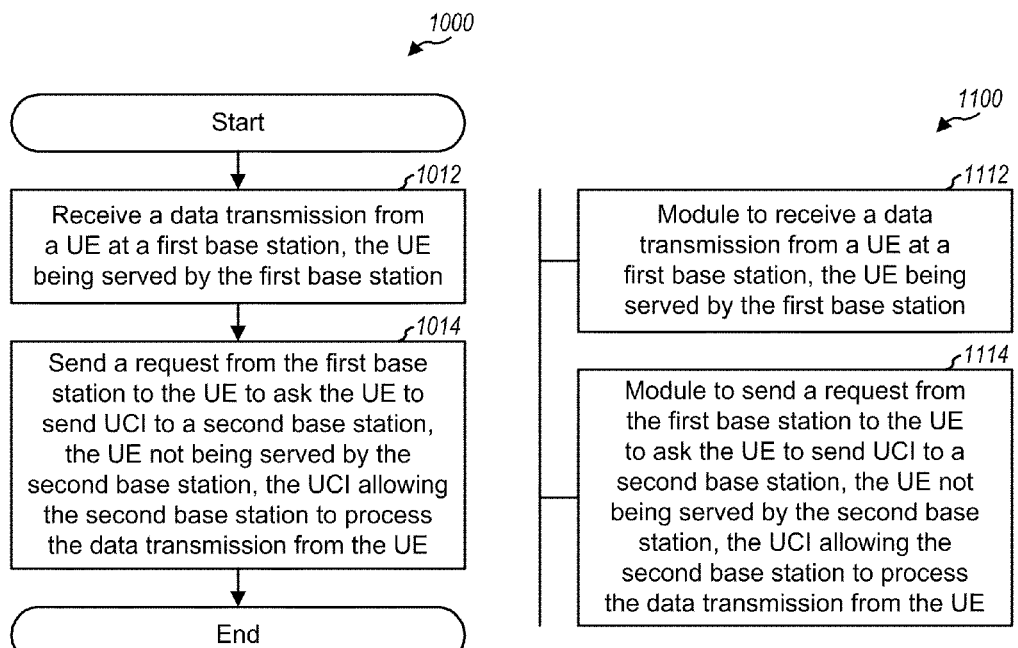
FIG. 10
FIG. 11

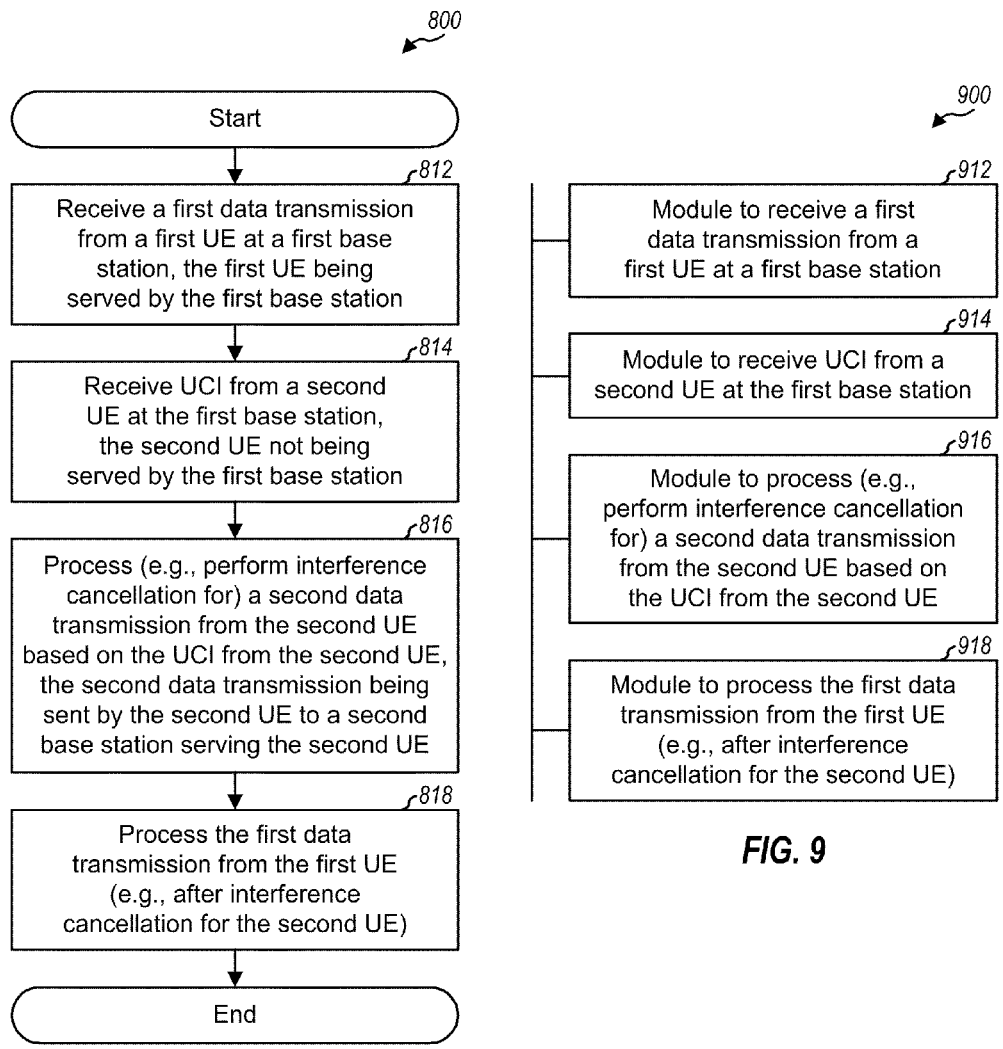

METHOD AND APPARATUS FOR USING UPLINK CONTROL INFORMATION FOR INTER-CELL DECODING AND INTERFERENCE CANCELLATION

The present application claims priority to provisional U.S. Application Ser. No. 61/080,065, entitled "REVERSE RATE INDICATOR CHANNEL FOR INTER-CELL INTERFERENCE CANCELLATION," filed Jul. 11, 2008, assigned to the assignee hereof and incorporated herein by reference.

BACKGROUND

I. Field

The present disclosure relates generally to communication, and more specifically to techniques for transmitting and receiving information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may receive data transmissions from UEs on the uplink. A data transmission from a given UE may observe interference due to data transmissions sent by other UEs to neighbor base stations. The performance of the data transmission from this UE may be degraded by the interference from the other UEs.

SUMMARY

Techniques for supporting data transmission on the uplink in a wireless network are described herein. A UE may send a data transmission to a serving base station. In an aspect, the UE may also send uplink control information (UCI) to a non-serving base station to allow the non-serving base station to process the data transmission from the UE. In one design, the UCI may include pertinent information to allow the non-serving base station to estimate the interference due to the data transmission from the UE and to cancel the interference at the non-serving base station. The interference cancellation may improve the received signal quality at the non-serving base station. After the interference cancellation, the non-serving base station may process a data transmission from another UE served by the base station.

In one design, the UE may send the UCI on resources allocated to the UE for sending the UCI. In another design, the UE may superimpose the UCI on the data transmission. For both designs, the UE may send the UCI in response to a request from the serving base station or based on some other trigger.

Various aspects and features of the disclosure are described in further detail below.

BRIEF DESCRIPTION OF THE DRAWINGS

FIGS. 2A and 2B show one design of uplink data transmission without and with UCI, respectively.

FIGS. 6 and 7 show a process and an apparatus, respectively, for sending UCI by a UE.

FIGS. 8 and 9 show a process and an apparatus, respectively, for receiving and using UCI by a base station.

FIGS. 10 and 11 show a process and an apparatus, respectively, for a serving base station.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
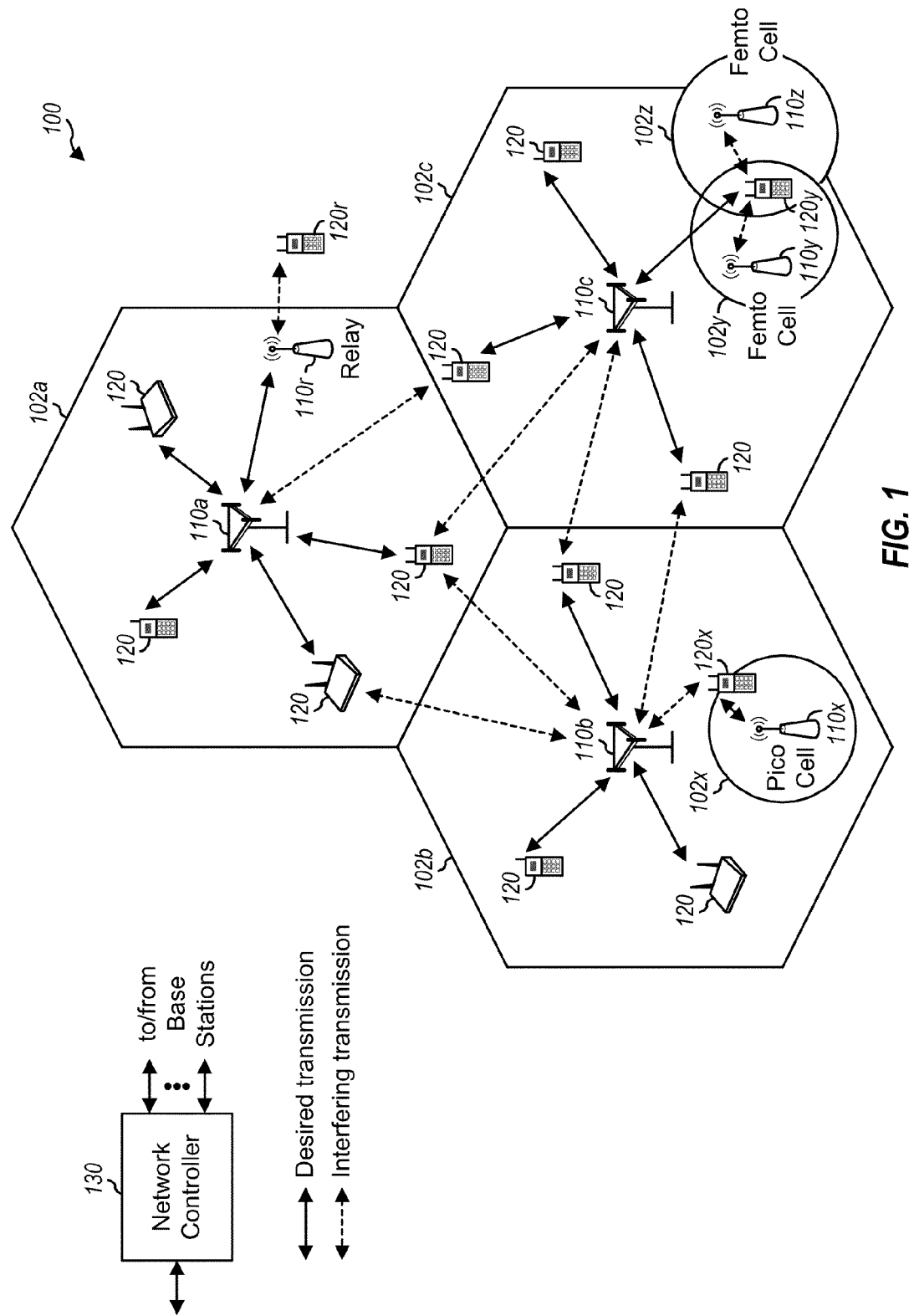
FIG. 1 shows a wireless communication network.

FIG. 1 shows a wireless communication network 100, which may include a number of base stations 110 and other network entities. A base station may be a station that communicates with the UEs and may also be referred to as a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, base stations 110a, 110b and 110c may be macro base stations for macro cells 102a, 102b and 102c, respectively. Base station 110x may be a pico base station for a pico cell 102x. Base stations 110y and 110z may be femto base stations for femto cells 102y and 102z, respectively. A base station may support one or multiple (e.g., three) cells.

Wireless network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1, a relay station 110r may communicate with macro base station 110a and a UE 120r in order to facilitate communication between base station 110a and UE 120r. A relay station may also be referred to as a relay, a relay base station, etc.

Wireless network 100 may be a homogenous network that includes only macro base stations, only femto base stations, etc. Wireless network 100 may also be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts) whereas pico base stations, femto base stations, and relays may have a lower transmit power level (e.g., 1 Watt).

A network controller 130 may couple to a set of base stations and may provide coordination and control for these base stations. Network controller 130 may communicate with base stations 110 via a backhaul. Base stations 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro base stations, pico base stations, femto base stations, relays, etc. In FIG. 1, a solid line with double arrows indicates desired transmissions between a UE and a serving base station, which is a base station designated to serve the UE on the downlink and/or uplink. A dashed line with double arrows indicates interfering transmissions between a UE and a non-serving base station, which is a base station not serving the UE.

Wireless network 100 may utilize orthogonal frequency division multiplexing (OFDM) and/or single-carrier frequency division multiplexing (SC-FDM). For example, wireless network 100 may be (i) an LTE network that utilizes OFDM on the downlink and SC-FDM on the uplink or (ii) a UMB network that utilizes OFDM on both the downlink and uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands or subzones. For example, a subband may cover 1.08 MHz, and there may be 1, 2, 4, 8 or 16 subbands for system bandwidth of 1.25, 2.5, 5, 10 or 20 MHz, respectively.

Wireless network 100 may support data transmission with hybrid automatic retransmission (HARQ). For HARQ on the uplink, a UE may send a transmission of a packet and may send one or more additional transmissions of the packet, if needed, until the packet is decoded correctly by a base station, or the maximum number of transmissions has been sent, or some other termination condition is encountered. The UE may thus send a variable number of transmissions of the packet. Each transmission of the packet may be referred to as an HARQ transmission. For asynchronous HARQ, an additional transmission may be sent a variable amount of time after a prior transmission. For synchronous HARQ, an additional transmission may be sent a fixed amount of time after a prior transmission.

To send a packet with HARQ, the UE may encode the packet to obtain a coded packet and may partition the coded packet into multiple redundancy versions or blocks. Each redundancy version may include different redundancy information (e.g., different code bits) for the packet. The UE may send one redundancy version for each transmission of the packet. The UE may send the redundancy versions in a sequential order or an arbitrary order that may be selected by the UE.

A UE may be within the coverage of multiple base stations. One of these base stations may be selected to serve the UE. The serving base station may be selected based on various criteria such as geometry, pathloss, etc. Geometry may be quantified by a signal-to-noise ratio (SNR), a signal-to-noise-and-interference ratio (SINR), a carrier-to-interference ratio (C/I), etc.

The UE may send a data transmission on the uplink to the serving base station. The data transmission from the UE may cause high interference to a non-serving base station. This may be the case, for example, due to restricted association. For example, in FIG. 1, UE 120y may be close to femto base station 110y and may have high received power for base station 110y. However, UE 120y may not be able to access femto base station 110y due to restricted association and may then connect to macro base station 110c with lower received power (as shown in FIG. 1) or to femto base station 110z also with lower received power (not shown in FIG. 1). UE 120y may then cause high interference to femto base station 110y on the uplink.

In an aspect, a UE may send uplink control information (UCI) to enable a non-serving base station to process (e.g., perform interference cancellation for) a data transmission from the UE. In one design, the UCI may include pertinent information to allow the non-serving base station to estimate the interference due to the data transmission from the UE and to cancel the interference at the non-serving base station. This may improve the received signal quality at the non-serving base station. The UCI may be particularly useful in the case of restricted association, since the non-serving base station may be a femto base station with restricted access and may observe high interference from the UE. The UCI may also be useful for network processing schemes in which multiple base stations may jointly monitor and decode the data transmission of the UE. The UCI may include various types of information and may be sent in various manners, as described below.

FIG. 2A shows a first scheme for uplink data transmission to a serving base station. A first base station (base station 1) may communicate with a first UE (UE1), which may cause high interference to a second base station (base station 2). In a restricted association scenario, the first base station may be a macro base station, and the second base station may be a femto base station that the first UE is not able to access. The second base station may communicate with a second UE (UE2).

For uplink data transmission, the first UE may send a resource request to the first base station. The first base station may estimate the uplink channel quality for the first UE, allocate resources (e.g., resource blocks) to the first UE, and send an uplink grant to the first UE. The uplink grant may indicate the resources allocated to the first UE, a modulation and coding scheme (MCS), a transport block size, a redundancy version for HARQ, and/or other parameters to be used by the first UE for sending data on the uplink. The first UE may process data in accordance with the uplink grant and may send a data transmission on the uplink to the first base station. The data transmission may comprise one or more HARQ transmissions for one or more packets. The first base station may process the data transmission from the first UE in accordance with the uplink grant to recover the data sent by the first UE.

The data transmission from the first UE may cause high interference to the second base station. The high interference may impact the ability of the second base station to decode a data transmission sent by the second UE to the second base station.

FIG. 2B shows a design of uplink data transmission to a serving base station with UCI to a non-serving base station. The first UE may send a resource request to the first base station, which may send an uplink grant to the first UE, as described above for FIG. 2A. The first UE may process data in accordance with the uplink grant, send a data transmission on the uplink to the first base station, and send UCI to the second base station. The first base station may process the data transmission from the first UE in accordance with the uplink grant to recover the data sent by the first UE. The second base station may also process the data transmission from the first UE in accordance with the UCI. The second base station may estimate the interference due to the data transmission from the UE and may cancel the interference at the second base station. The second base station may then process the data transmission from the second UE to recover the data sent by the second UE.

Figure 3A:
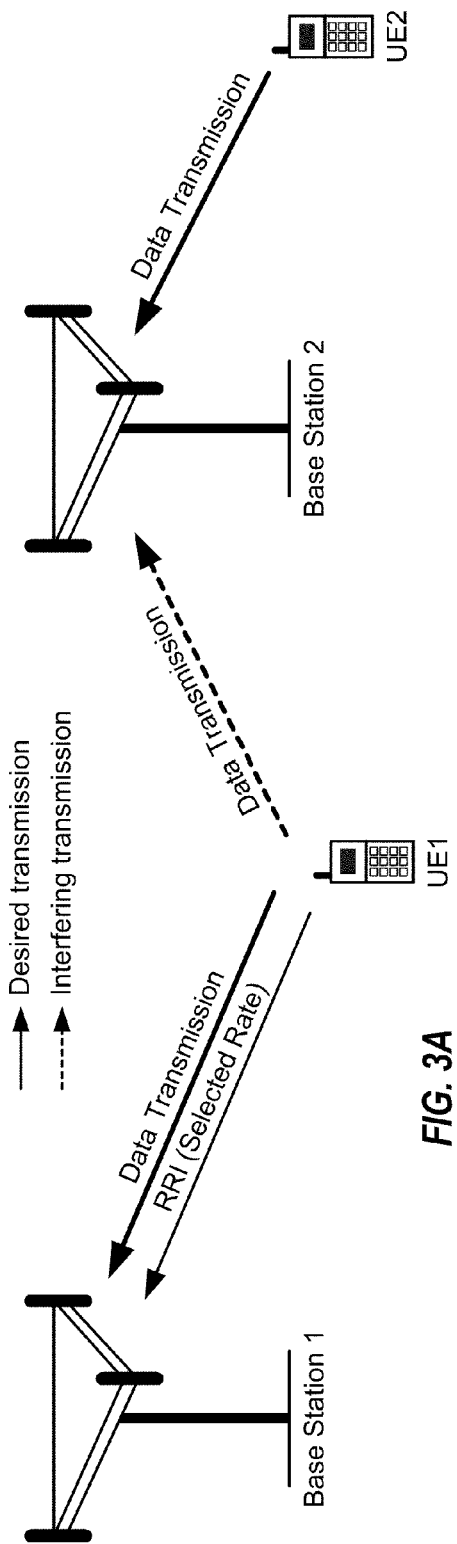
FIGS. 3A and 3B show another design of uplink data transmission without and with UCI, respectively.

FIG. 3A shows a second scheme for uplink data transmission to a serving base station. The first UE may receive an uplink configuration from the first base station (not shown in FIG. 3A). The uplink configuration may indicate the maximum rate that the first UE can transmit, the resources that can be used by the UE, etc. The uplink configuration may also be for a semi-persistent assignment, an assignment for autonomous transmission by the first UE, etc.

For uplink data transmission, the first UE may select a rate to use for sending data. The selected rate may be dependent on various factors such as the amount of data to send, the uplink configuration, etc. The first UE may process data in accordance with the selected rate and may send a data transmission on the uplink to the first base station. The first UE may also send a reverse rate indicator (RRI), which may convey the selected rate, to the first base station. The first base station may process the data transmission from the first UE in accordance with the RRI to recover the data sent by the first UE.

The data transmission from the first UE may cause high interference to the second base station. The high interference may impact the ability of the second base station to decode the data transmission from the second UE.

Figure 3B:
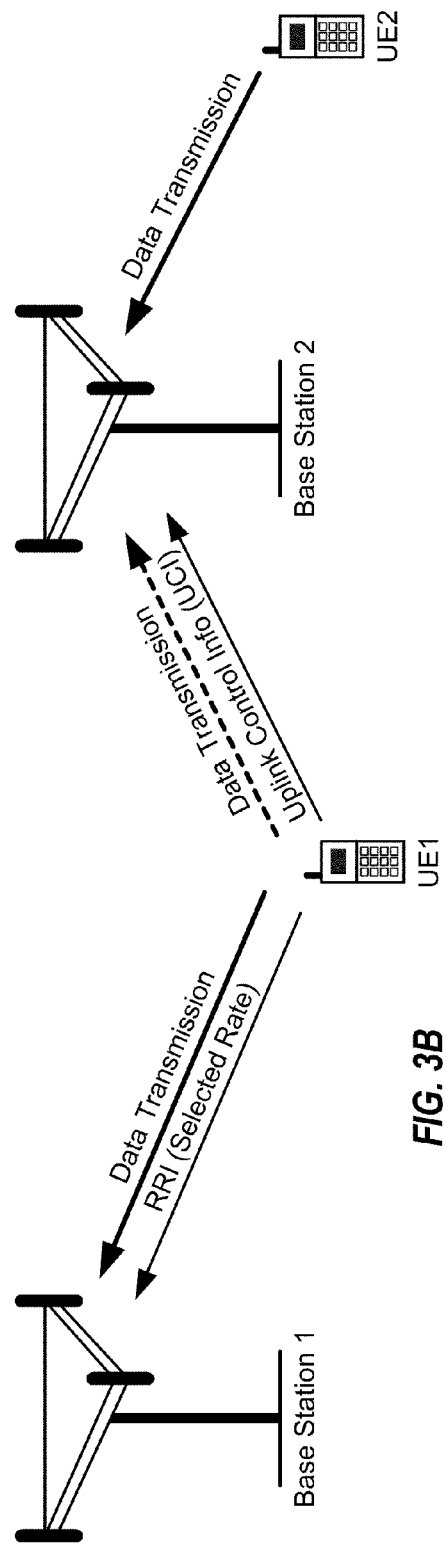

FIG. 3B shows another design of uplink data transmission to a serving base station with UCI to a non-serving base station. The first UE may receive an uplink configuration from the first base station. For uplink data transmission, the first UE may select a rate to use for sending data, process data in accordance with the selected rate, and send a data transmission and an RRI to the first base station. The first UE may also send UCI to the second base station. The first base station may process the data transmission from the first UE in accordance with the RRI to recover the data sent by the first UE. The second base station may also process the data transmission from the first UE in accordance with the UCI. The second base station may estimate the interference due to the data transmission from the first UE and may cancel the interference at the second base station. The second base station may then process the data transmission from the second UE to recover the data sent by the second UE.

FIGS. 2A and 3A show two schemes for uplink data transmission. In FIG. 2A, a serving base station determines various parameters for uplink data transmission and sends these parameters to a UE. The UE processes and sends data in accordance with the parameters received from the serving base station. The serving base station knows the parameters and can process the data transmission from the UE. The non-serving base stations do not know the parameters and may be unable to process the data transmission from the UE.

In FIG. 3A, a UE can select one or more parameters (e.g., a rate) for uplink data transmission. The UE then processes data in accordance with the selected parameter(s) and possibly other configured parameters known by both the UE and a serving base station. The UE sends a data transmission and the selected parameter(s) to the serving base station. The serving base station can process the data transmission from the UE in accordance with the selected parameter(s) and possibly other configured parameters. The selected parameter(s) are intended for the serving base station. Hence, the non-serving base stations normally do not receive the selected parameter(s). Furthermore, the non-serving base stations may not be able to process the data transmission from the UE based solely on the selected parameter(s), i.e., the selected parameter(s) may be insufficient.

FIGS. 2B and 3B show two designs of uplink data transmission with UCI to a non-serving base station. In FIG. 2B, a UE sends UCI to a non-serving base station to allow this base station to process a data transmission from the UE. The UE may receive parameters in an uplink grant from a serving base station. The UCI may include the parameters in the uplink grant and/or other parameters. The UCI allows the non-serving base station to estimate and cancel the interference due to the data transmission from the UE.

In FIG. 3B, a UE sends UCI to a non-serving base station to allow this base station to process a data transmission from the UE. The UCI may include one or more parameter(s) selected by the UE and possibly other configured parameters known by both the UE and its serving base station. The UCI allows the non-serving base station to estimate and cancel the interference due to the data transmission from the UE.

In general, UCI may include any information that may be pertinent to a non-serving base station to process a data transmission from a UE not served by the base station. Table 1 lists some information that may be included in the UCI, in accordance with one design.

TABLE 1

Uplink Control Information (UCI) for Non-Serving Base Station

| Information | Description |
| --- | --- |
| UE Identity | Identity of a UE sending the UCI |
| Serving Cell Identity | Identity of a serving cell for the UE |
| Rate Info | Indicate coding scheme, modulation scheme, packet length, etc. used for uplink data transmission |
| Resource Info | Indicate resources used to send uplink data transmission |
| HARQ Info | Indicate parameters for HARQ for uplink data transmission |
| Pilot Info | Indicate parameters for pilot transmission on uplink |

The UE identity (ID) may be a Medium Access Control Identity (MACID), a Radio Network Temporary Identifier (RNTI), or some other type of identity. The serving cell ID may be a physical cell ID, a scrambling code, a pseudo-random number (PN) offset, a Walsh sequence, and/or some other identity assigned to the serving cell. The UE ID and the serving cell ID may be static or semi-static information and may be conveyed to a non-serving base station via the backhaul using a suitable communication protocol or interface. The uplink data transmission may be scrambled or channelized based on the UE ID and/or the serving cell ID. The non-serving base station may thus be provided with the UE ID and/or the serving cell ID in order to perform the complementary descrambling or de-channelization of the uplink data transmission from the UE.

The rate information may comprise various parameters used for uplink data transmission by the UE. These parameters may include a coding scheme and/or a code rate, a modulation scheme, a data rate, a packet size or length, the number of packets to send, the number of antennas to use for data transmission, a preceding mode if multiple antennas are used for data transmission, etc. The rate information may also be referred to as and/or may comprise a modulation and coding scheme (MCS), a packet format, a transport format, a rate, etc. The rate information may be dynamic and may vary from subframe to subframe or from packet to packet, e.g., due to changes in channel conditions, interference avoidance mechanisms, and/or other factors.

The resource information may indicate resources used for uplink data transmission by the UE. In general, resources may be quantified by time, frequency, code, transmit power, etc. The resources used for uplink data transmission may be given by one or more resource blocks, a node ID of a node in a channel tree, one or more spreading sequences, a transmit power level, etc.

The HARQ information may indicate which redundancy information is being sent in an uplink data transmission. The UE may send multiple HARQ transmissions for a given packet, one HARQ transmission at a time. Each HARQ transmission may carry different redundancy information for the packet and may be associated with a different redundancy version or an HARQ index. The HARQ information may comprise a redundancy version or an HARQ index of the redundancy information being sent in the uplink data transmission. The HARQ information may be used by the non-serving base station to decode the packet.

The pilot information may indicate parameters for a reference signal or pilot sent by the UE. Alternatively, the format of the reference signal or pilot may be known a priori by the non-serving base station, and the pilot information may not need to be sent. The non-serving base station may use the reference signal or pilot to derive a channel estimate for the UE and may then perform interference cancellation for the UE with the channel estimate. The effectiveness of the interference cancellation may be dependent on the quality of the channel estimate.

Table 1 lists some information that may be included in the UCI. The UCI may include different and/or additional information. The information to include in the UCI may be dependent on how a data transmission is sent on the uplink, which may vary from radio technology to radio technology. In any case, the UCI may include all pertinent information for an uplink data transmission from the UE so that the non-serving base station can process (e.g., perform interference cancellation for) the uplink data transmission.

The UCI may be sent to the non-serving base station in various manners. In one design, part of the UCI may be static or semi-static and may be sent via the backhaul, e.g., from the serving base station to the non-serving base station. Part of the UCI may be dynamic and may be sent by the UE on the uplink to the non-serving base station, e.g., as shown in FIG. 2B or 3B. It may be desirable to reduce the amount of UCI to send on the uplink in order to reduce overhead as well as interference due to the UCI.

In one exemplary design, the UCI may comprise about 16 bits, which may include 5 or 6 bits for rate information, 3 bits for resource information, 3 bits for HARQ information, and some reserved bits. The UCI may also include fewer or more bits for each type of information. A cyclic redundancy check (CRC) may be generated for the UCI and sent with the UCI. The CRC may be used by the non-serving base station to determine whether the UCI is received. The CRC may comprise 4 bits, fewer bits, or more bits.

The UE may send the UCI to the non-serving base station in various manners. The UCI may be sent on a feedback channel, which may be referred to as a UCI channel, an RRI channel, etc.

In a dedicated bandwidth design, the UE may be allocated some resources by the serving base station for sending the UCI. The allocated resources may be referred to as UCI resources. The UE may send the UCI on the UCI resources to the non-serving base station. The UE may also send data to the serving base station, instead of UCI, on the UCI resources. The non-serving base station may be informed of the UCI resources, e.g., via the backhaul or some other mechanism. The non-serving base station may also reserve the UCI resources for the UE.

In one example of the dedicated bandwidth design, the UE may be assigned a UCI segment for sending the UCI. The UCI segment may comprise six subcarriers, which may correspond to 6% overhead for a resource assignment of one subband of 1.25 MHz or 1.5% overhead for a resource assignment of four subbands of 5 MHz. The UE may encode the UCI with a convolutional code, a block code, and/or some other code to obtain a codeword. The UE may send the codeword once in the UCI segment or multiple times to obtain diversity. The UE may send the UCI in the same subband as the data transmission (if only one subband is assigned) or in a designated subband (if multiple subbands are assigned). The UCI may be sent in similar manner as data, e.g., with the same channelization and frequency hopping, which may be dependent on the UE identity. The non-serving base station may be aware of the channelization and frequency hopping by the UE.

The UE may also send the UCI on the UCI resources in other manners. The serving base station may also ask the UE to send data, instead of the UCI, on the UCI resources in order to save the overhead for UCI.

In a superposition design, the UE may send the UCI by superimposing it on the uplink data transmission. The UE may generate a data waveform for the uplink data transmission. The UE may also generate a UCI waveform based on the UCI. The UE may then add the UCI waveform to the data waveform to obtain a composite waveform. The composite waveform may comprise the UCI waveform superimposed on the data waveform. The UCI waveform may comprise low frequency components and may thus slowly modulate the envelop of the data waveform. The serving base station may know the UCI and can thus remove the UCI waveform. The non-serving base station may not know the UCI and may thus attempt to decode the UCI waveform first. The non-serving base station may then remove the UCI waveform. The superposition design may allow the UE to send the UCI without requiring additional time-frequency resources. However, the UCI waveform may increase the transmit power of the UE and may observe an SNR floor due to the data waveform. The UCI waveform may be generated so that it can be reliably received by the non-serving base station. The UCI waveform may also be sent in only an earlier part of the data waveform to allow the non-serving base station to recover the UCI sooner and start decoding the data waveform earlier. The UCI waveform may also be generated and sent such that residual interference due to the UCI waveform, after canceling the UCI waveform, is negligible at the serving and non-serving base stations.

In general, different types of information in the UCI may be sent explicitly or implicitly. A given information may be sent explicitly by including the information in a payload or a field of a message. A given information may be sent implicitly by manipulating (e.g., scrambling) the message with the information.

The UE may send the UCI based on the dedicated bandwidth design, the superposition design, or some other design. The UE may send the UCI to obtain the desired reliability, e.g., a target misdetection probability and a target false alarm probability, at the non-serving base station. Misdetection refers to a failure by the non-serving base station to decode the UCI. This may result in loss of bandwidth for the non-serving base station, which may schedule its UE(s) with an assumption that it can cancel the interference from the UE and hence improve the SNR of its UE(s). The target misdetection probability may be set relatively low (e.g., 1%) to minimize the loss of bandwidth. False alarm refers to an erroneous detection of UCI by the non-serving base station when it is not sent by the UE. The non-serving base station may then attempt to decode a data transmission from the UE, which is not sent. False alarm may thus result in additional processing by the non-serving base station but may minimally impact performance. The target false alarm probability may be set relatively high (e.g., more than 10%), which may allow for use of a smaller CRC (e.g., a 4-bit CRC).

The UE may send the UCI to the non-serving base station when triggered. In one design, the serving base station may instruct the UE to send the UCI to the non-serving base station. For example, the serving base station may receive a pilot measurement report from the UE. The report may indicate a non-serving base station with high received signal strength at the UE and thus likely to observe high interference from the UE. The serving base station may then instruct the UE to send the UCI to the non-serving base station. In another design, the UE may determine whether to send the UCI to the non-serving base station. For example, the UE may decide to send the UCI if the received signal strength of the non-serving base station exceeds a threshold. In yet another design, the non-serving base station may instruct the UE to send the UCI if the non-serving base station observes high interference from the UE. The UCI may also be sent based on other triggers.

For simplicity, FIGS. 2A to 3B show the first UE having one non-serving base station. In general, a UE may have any number of non-serving base stations observing high interference from the UE. The UE may send the UCI to one or more non-serving base stations to allow each non-serving base station to process a data transmission from the UE.

Also for simplicity, FIGS. 2A to 3B show the second base station having one interfering UE. In general, a base station may have any number of non-served UEs causing high interference to the base station. The base station may receive UCI from one or more non-served UEs and may process (e.g., perform interference cancellation for) the data transmission from each non-served UE. For example, the base station may perform interference cancellation for only the strongest non-served UE, a predetermined number of strongest non-served UEs, non-served UEs whose received signal strength exceeds a particular threshold, non-served UEs whose UCI can be decoded by the base station, etc.

Figure 4:
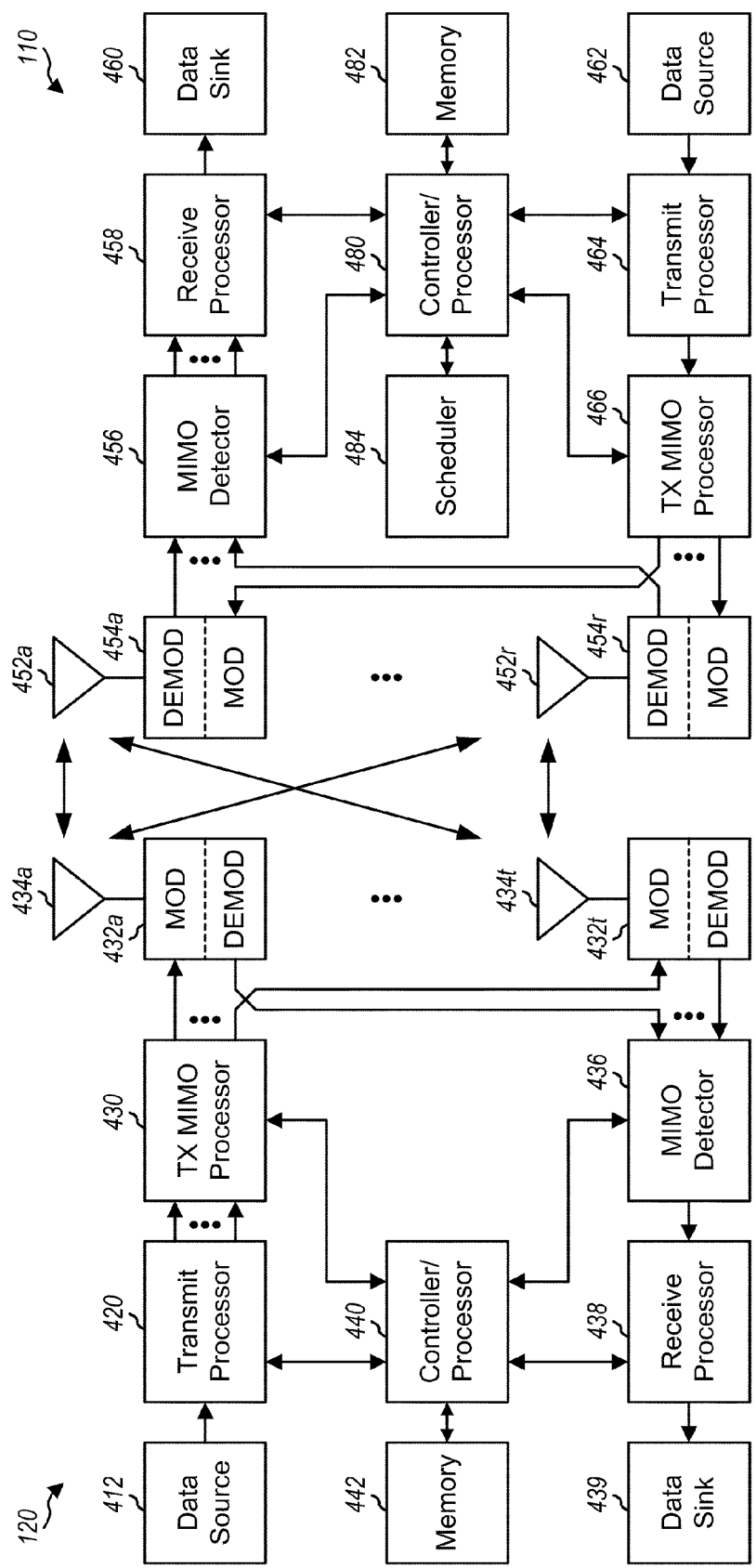
FIG. 4 shows a block diagram of a base station and a UE.

FIG. 4 shows a block diagram of a design of a base station 110 and a UE 120, which may be one of the base stations and one of the UEs in FIG. 1. UE 120 may be equipped with T antennas 434a through 434t, and base station 110 may be equipped with R antennas 452a through 452r, where in general T≥1 and R≥1.

At UE 120, a transmit processor 420 may receive data from a data source 412, process (e.g., encode, interleave, and symbol map) the data, and provide data symbols. Transmit processor 420 may also process control information (e.g., UCI) from a controller/processor 440 and provide control symbols. Transmit processor 420 may also generate pilot symbols. A transmit (TX) multiple-input multiple-output (MIMO) processor 430 may perform precoding on the data symbols, the control symbols, and/or the pilot symbols, if applicable. Processor 430 may provide T output symbol streams to T modulators (MODs) 432a through 432t. Each modulator 432 may process a respective output symbol stream (e.g., for SC-FDM, OFDM, CDMA, etc.) to obtain an output sample stream. Each modulator 432 may further process (e.g., convert to analog, amplify, filter, and upconvert) the output sample stream to obtain an uplink signal. T uplink signals from modulators 432a through 432t may be transmitted via T antennas 434a through 434t, respectively.

At base station 110, antennas 452a through 452r may receive the uplink signals from UE 120 and other UEs and may provide received signals to demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for SC-FDM, OFDM, CDMA, etc.) to obtain received symbols. A MIMO detector 456 may obtain received symbols from all R demodulators 454a through 454r, perform receiver spatial processing on the received symbols if applicable, and provide detected symbols. A receive processor 458 may process (e.g., demodulate, deinterleave, and decode) the detected symbols, provide decoded data for UE 120 to a data sink 460, and provide decoded control information (e.g., UCI) to a controller/processor 480.

On the downlink, at base station 110, a transmit processor 464 may receive and process data for one or more UEs from a data source 462 and control information from controller/ processor 480. Transmit processor 464 may also generate pilot symbols. The symbols from transmit processor 464 may be precoded by a TX MIMO processor 466 if applicable, further processed by modulators 454a through 454r, and transmitted to the UEs. At UE 120, the downlink signals from base station 110 and other base stations may be received by antennas 434, processed by demodulators 432, detected by a MIMO detector 436 if applicable, and further processed by a receive processor 438 to obtain decoded data and control information transmitted to UE 120.

Controllers/processors 440 and 480 may direct the operation at UE 120 and base station 110, respectively. Memories 442 and 482 may store data and program codes for UE 120 and base station 110, respectively. A scheduler 484 may schedule UEs for data transmission on the downlink and/or uplink and may provide grants for the scheduled UEs.

Figure 5:
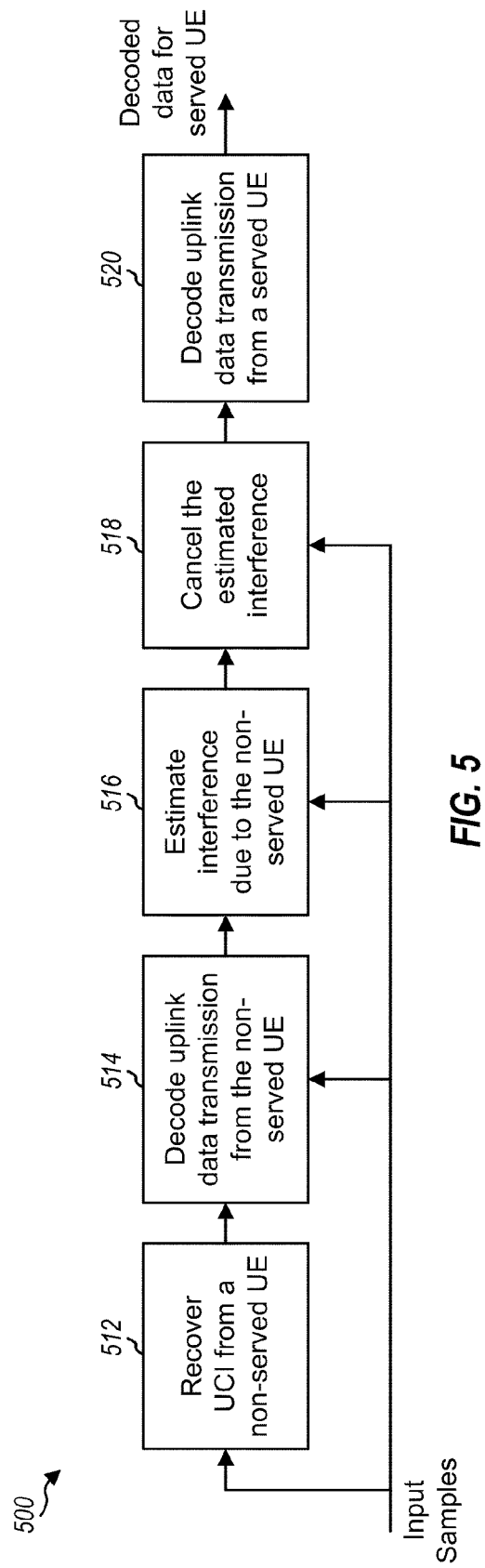
FIG. 5 shows a process for data reception with interference cancellation.

FIG. 5 shows a design of a process 500 for data reception with interference cancellation by a base station, e.g., base station 110 in FIG. 4. Process 500 may be performed by demodulators 454, detector 456, receive processor 458, and/or other processors at base station 110.

For process 500, a block 512 may process the input samples to recover UCI from a non-served UE, which is a UE that is not served by the base station. The processing by block 512 may be dependent on how the UCI is sent, e.g., on allocated resources or with superposition. A block 514 may process the input samples in accordance with the recovered UCI to decode an uplink data transmission from the non-served UE. A block 516 may estimate the interference due to the uplink data transmission from the non-served UE based on the decoded data for this UE. To estimate the interference, block 516 may derive a channel estimate for the non-served UE based on the input samples, e.g., using the pilot transmitted by the non-served UE. Block 516 may process (e.g., encode, interleave, symbol map, etc.) the decoded data for the non-served UE in the same manner as performed by this UE. Block 516 may then apply the resultant symbols through the channel estimate to obtain the estimated interference. A block 518 may subtract the estimated interference from the input samples and provide interference-canceled samples.

Blocks 512 to 518 may perform interference cancellation for any number of non-served UEs. The processing by blocks 512 to 518 may be repeated for each non-served UE whose uplink data transmission is to be canceled. After completing the interference cancellation for all non-served UEs of interest, a block 520 may process the interference-canceled samples to decode an uplink data transmission from a served UE.

FIG. 5 shows a design of interference cancellation after decoding. Interference cancellation may also be performed without decoding. For example, the interference due to an uplink data transmission from a non-served UE may be estimated based on the input samples prior to demodulation, the received symbols from demodulators 454, the detected symbols from detector 456, etc. The estimated interference may then be subtracted from the input samples, the received symbols, etc. As another example, a channel estimate for a non-served UE may be used to derive a spatial filter matrix that may attempt to null out an uplink data transmission from the non-served UE. MIMO detector 456 may then apply the spatial filter matrix to attenuate the interference due to the uplink data transmission from the non-served UE.

FIG. 6 shows a design of a process 600 for sending UCI by a UE. The UE may send a data transmission to a serving base station (block 612). The UE may send UCI to a non-serving base station to allow the non-serving base station to process (e.g., perform interference cancellation for) the data transmission from the UE (block 614). The UCI may comprise all or some of the information in Table 1 and/or other information. The UE may also send a CRC for the UCI to allow the non-serving base station to determine whether the UCI is received from the UE.

In one design, which is shown in FIG. 2B, the UE may receive an uplink grant from the serving base station. The uplink grant may comprise at least one parameter for the data transmission. The UE may generate the UCI for the non-serving base station based on the uplink grant from the serving base station. For example, the UCI may comprise all or a subset of the parameters in the uplink grant. In another design, which is shown in FIG. 3B, the UE may select a rate for the data transmission and may generate the UCI to include the selected rate and possibly other information. The UE may also send the selected rate to the serving base station.

In one design of block 614, the UE may send the UCI on resources allocated to the UE for sending the UCI. The UE may send data instead of the UCI on the allocated resources if requested by the serving base station. In another design of block 614, the UE may generate a first waveform based on the UCI. The UE may then superimpose the first waveform on a second waveform for the data transmission.

In one design, the UE may autonomously determine whether to send the UCI, e.g., based on received signal strength of the non-serving base station at the UE. In other designs, the serving base station or the non-serving base station may request the UE to send the UCI to the non-serving base station.

FIG. 7 shows a design of an apparatus 700 for sending UCI. Apparatus 700 includes a module 712 to send a data transmission from a UE to a serving base station, and a module 714 to send UCI from the UE to a non-serving base station to allow the non-serving base station to process the data transmission from the UE.

FIG. 8 shows a design of a process 800 for receiving and using UCI. A first base station may receive a first data transmission from a first UE served by the first base station (block 812). The first base station may receive UCI from a second UE not served by the first base station (block 814). The first base station may determine whether or not the UCI is received based on a CRC sent by the second UE with the UCI. The first base station may process a second data transmission from the second UE based on the UCI from the second UE (block 816). The second data transmission may be sent by the second UE to a second base station serving the second UE. The first base station may receive additional UCI (e.g., static or semi-static information such as a UE ID, a serving cell ID, etc.) for the second UE from the second base station. The first base station may then process the second data transmission from the second UE based further on the additional UCI. The UCI and the additional UCI may comprise all or some of the information in Table 1 and/or other information. The first base station may process the first data transmission from the first UE, e.g., after interference cancellation for the second UE (block 818).

In one design of block 814, the first base station may receive the UCI on resources allocated to the second UE for sending the UCI. In another design of block 814, the first base station may process a received signal to detect for a first waveform comprising the UCI. The first base station may then cancel the first waveform from the received signal to obtain a modified signal comprising the first and second data transmissions from the first and second UEs.

In one design of block 816, the first base station may perform interference cancellation for the second data transmission from the second UE. The first base station may process a received signal based on the UCI to obtain decoded data for the second data transmission from the second UE. The first base station may estimate the interference due to the second data transmission based on the decoded data. The first base station may also estimate the interference based on the received signal and the UCI, without decoding the second data transmission. In any case, the first base station may subtract the estimated interference from the received signal to obtain an interference-canceled signal.

In another design of block 816, the first base station may decode the second data transmission from the second UE based on the UCI from the second UE. The first base station may then pass the decoded data from the second data transmission to the second base station. The first base station may or may not perform interference cancellation in this design.

The first base station may send a request to the second UE to ask the second UE to send the UCI to the first base station. The second UE may also send the UCI based on some other trigger. The first and second base stations may have different association types. For example, the first base station may be a femto base station, and the second base station may be a macro base station, or vice versa.

FIG. 9 shows a design of an apparatus 900 for sending and using UCI. Apparatus 900 includes a module 912 to receive a first data transmission from a first UE at a first base station serving the first UE, a module 914 to receive UCI from a second UE at the first base station not serving the second UE, a module 916 to process (e.g., perform interference cancellation for) a second data transmission from the second UE based on the UCI from the second UE, the second data transmission being sent by the second UE to a second base station serving the second UE, and a module 918 to process the first data transmission from the first UE (e.g., after interference cancellation for the second UE).

FIG. 10 shows a design of a process 1000 performed by a serving/first base station. The first base station may receive a data transmission from a UE served by the first base station (block 1012). The first base station may send a request to the UE to ask the UE to send UCI to a second base station not serving the UE (block 1014). The UCI may allow the second base station to process (e.g., perform interference cancellation for) the data transmission from the UE. The first base station may send additional UCI for the UE to the second base station. The data transmission from the UE may be processed by the second base station based on the UCI from the UE and possibly the additional UCI from the first base station.

In one design, the first base station may send an uplink grant to the UE. The uplink grant may comprise at least one parameter for the data transmission. The UCI may be generated by the UE based on the uplink grant. In another design, the first base station may receive a rate selected by the UE for the data transmission. The UCI may comprise the selected rate.

In one design, the first base station may allocate resources to the UE for sending the UCI to the second base station. The first base station may communicate with the second base station to determine the resources to allocate to the UE for sending the UCI. The first base station may request the UE to send data instead of the UCI on the allocated resources and may thereafter receive data on the allocated resources from the UE. In another design, the first base station may generate a first waveform based on the UCI, which may be known by the first base station. The first base station may then cancel the first waveform from a received signal at the first base station to obtain a modified signal comprising the data transmission from the UE.

FIG. 11 shows a design of an apparatus 1100 for a serving/first base station. Apparatus 1100 includes a module 1112 to receive a data transmission from a UE at the first base station serving the UE, and a module 1114 to send a request from the first base station to the UE to ask the UE to send UCI to a second base station not serving the UE.

The modules in FIGS. 7, 9 and 11 may comprise processors, electronics devices, hardware devices, electronics components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   generating a data transmission at a user equipment (UE) for transmitting over uplink resources allocated by a serving base station to the UE;
   generating uplink control information (UCI) at the UE for a non-serving base station, wherein the UCI includes information for enabling the non-serving base station to cancel interference caused by the data transmission, wherein the information includes at least an indication of the uplink resources, and wherein the UCI includes a reverse rate indicator that indicates a rate selected by the UE;
   sending the UCI from the UE to the non-serving base station over UCI resources allocated between the UE and the non-serving base station; and
   sending the data transmission over the uplink resources.

2. The method of claim 1, further comprising:
   receiving from a serving base station an uplink grant comprising at least one parameter for the data transmission over the uplink resources, wherein the generating the UCI for the non-serving base station is based on the uplink grant from the serving base station.

3. The method of claim 1, further comprising:
   sending the rate to the serving base station.

4. The method of claim 1, further comprising receiving an allocation of the UCI resources from the serving base station.

5. The method of claim 4, further comprising receiving an allocation of the UCI resources from the non-serving base station.

6. The method of claim 1, wherein the sending the UCI comprises:
   generating a first waveform based on the UCI; and
   superimposing the first waveform on a second waveform for the data transmission.

7. The method of claim 1, wherein the UCI comprises a UE identity, a serving cell identity, resource information, hybrid automatic retransmission request (HARQ) information, pilot information, or any combination thereof.

8. The method of claim 1, further comprising:
   sending a cyclic redundancy check (CRC) for the UCI to the non-serving base station.

9. The method of claim 1, further comprising:
   determining whether to send the UCI based on received signal strength of the non-serving base station at the UE.

10. An apparatus for wireless communication, comprising:
    means for generating a data transmission at a user equipment (UE) for transmitting over uplink resources allocated by a serving base station to the UE;
    means for generating uplink control information (UCI) at the UE for a non-serving base station, wherein the UCI includes information for enabling the non-serving base station to cancel interference caused by the data transmission, wherein the information includes at least an indication of the uplink resources, and wherein the UCI includes a reverse rate indicator that indicates a rate selected by the UE;
    means for sending the UCI from the UE to the non-serving base station over UCI resources allocated between the UE and the non-serving base station; and
    means for sending the data transmission over the uplink resources.

11. The apparatus of claim 10, further comprising:
    means for receiving from a serving base station an uplink grant comprising at least one parameter for the data transmission over the uplink resources, wherein the means for generating the UCI for the non-serving base station is based on the uplink grant from the serving base station.

12. The apparatus of claim 10, further comprising:
    means for sending the rate to the serving base station.

13. An apparatus for wireless communication, comprising:
    at least one processor configured to:
        send a data transmission from a user equipment (UE) to a serving base station over uplink resources allocated by the serving base station to the UE;
        generate uplink control information (UCI) for a non-serving base station, wherein the UCI enables the non-serving base station to cancel interference caused by the data transmission, wherein the information includes at least an indication of the uplink resources, and wherein the UCI includes a reverse rate indicator that indicates a rate selected by the UE; and
        send the UCI from the UE to the non-serving base station over UCI resources allocated between the UE and the non-serving base station.

14. The apparatus of claim 13, wherein the at least one processor is configured to receive from the serving base station an uplink grant comprising at least one parameter for the data transmission over the uplink resources, and to generate the UCI for the non-serving base station based on the uplink grant from the serving base station.

15. The apparatus of claim 13, wherein the at least one processor is configured to send the rate to the serving base station.

16. A non-transitory computer-readable medium having computer-executable code recorded thereon, the code comprising:
code for causing at least one computer to send a data transmission from a user equipment (UE) to a serving base station over uplink resources allocated by the serving base station to the UE;
code for causing the at least one computer to generate uplink control information (UCI) for a non-serving base station, wherein the UCI enables the non-serving base station to cancel interference caused by the data transmission, wherein the information includes at least an indication of the uplink resources, and wherein the UCI includes a reverse rate indicator that indicates a rate selected by the UE; and
code for causing the at least one computer to send the UCI from the UE to the non-serving base station over UCI resources allocated between the UE and the non-serving base station.

17. A method for wireless communication, comprising:
receiving a first data transmission from a first user equipment (UE) at a first base station over uplink resources allocated by the first base station to the first UE, the first UE being served by the first base station;
receiving, from a second UE, uplink control information (UCI) associated with the second UE at the first base station over UCI resources allocated between the second UE and the first base station, the second UE not being served by the first base station, wherein the UCI includes a reverse rate indicator that indicates a rate selected by the second UE;
based on the UCI, performing, at the first base station, interference cancellation of interference caused by a second data transmission from the second UE, the second data transmission being sent by the second UE to a second base station serving the second UE; and
processing the first data transmission from the first UE after the interference cancellation.

18. The method of claim 17, wherein the performing interference cancellation comprises:
processing a received signal at the first base station based on the UCI to obtain decoded data for the second data transmission from the second UE,
estimating the interference caused by the second data transmission based on the decoded data, and
subtracting the estimated interference from the received signal to obtain an interference-canceled signal.

19. The method of claim 17, wherein the performing interference cancellation comprises:
estimating the interference caused by the second data transmission based on a received signal at the first base station and the UCI, without decoding the second data transmission, and
subtracting the estimated interference from the received signal to obtain an interference-canceled signal.

20. The method of claim 17 further comprising:
processing, at the first base station, the second data transmission by:
decoding the second data transmission from the second UE based on the UCI from the second UE, and
forwarding decoded data from the second data transmission to the second base station.

21. The method of claim 17, wherein the UCI resources are allocated to the second UE by the second base station.

22. The method of claim 17, wherein the receiving the UCI comprises:
processing a received signal at the first base station to detect a first waveform comprising the UCI, and
canceling the first waveform from the received signal to obtain a modified signal comprising the first data transmission from the first UE and the second data transmission from the second UE.

23. The method of claim 17, wherein the UCI resources are allocated to the second UE by the first base station.

24. The method of claim 17, wherein the UCI comprises a UE identity, a serving cell identity, resource information, hybrid automatic retransmission request (HARQ) information, pilot information, or any combination thereof.

25. The method of claim 17, further comprising:
determining whether the UCI is received from the second UE based on a cyclic redundancy check (CRC) sent by the second UE with the UCI.

26. The method of claim 17, further comprising:
sending a request from the first base station to the second UE for the second UE to send the UCI to the first base station.

27. The method of claim 17, wherein the first and second base stations have different association types.

28. An apparatus for wireless communication, comprising:
means for receiving a first data transmission from a first user equipment (UE) at a first base station over uplink resources allocated by the first base station to the first UE, the first UE being served by the first base station;
means for receiving, at the first base station from a second UE, uplink control information (UCI) associated with the second UE over UCI resources allocated between the second UE and the first base station, the second UE not being served by the first base station, wherein the UCI includes a reverse rate indicator that indicates a rate selected by the second UE;
means for performing interference cancellation, at the first base station, based on the UCI associated the second UE, wherein the interference cancellation cancels interference caused by a second data transmission being sent by the second UE to a second base station serving the second UE; and
means for processing the first data transmission from the first UE after performing the interference cancellation.

29. The apparatus of claim 28, wherein the means for performing interference cancellation comprises:
means for processing a received signal at the first base station based on the UCI to obtain decoded data for the second data transmission from the second UE,
means for estimating interference due to the second data transmission based on the decoded data, and
means for subtracting the estimated interference from the received signal to obtain an interference-canceled signal.

30. The apparatus of claim 28, further comprising:
means for receiving the UCI associated with the second UE from the second base station, and wherein the second data transmission is processed based on the UCI from the second base station.

31. A method for wireless communication, comprising:
receiving a data transmission from a first user equipment (UE) at a first base station over uplink resources allocated by the first base station to the first UE, the first UE being served by the first base station;
receiving, at the first base station from a second UE, uplink control information (UCI) associated with the second UE over UCI resources allocated between the second UE and the first base station, wherein the second UE is not being served by the first base station, and wherein the UCI includes a reverse rate indicator that indicates a rate selected by the second UE;

based on the UCI, performing, at the first base station, interference cancellation of interference caused by a second data transmission sent from the second UE; and processing, at the first base station, the data transmission after performing the interference cancellation.

32. The method of claim 31 wherein the UCI associated with the second UE indicates second uplink resources allocated to the second UE based on an uplink grant.

33. The method of claim 31, further comprising:
allocating, at the first base station, the UCI resources to the second UE.

34. The method of claim 33, further comprising:
communicating with the second base station to determine the UCI resources.

35. The method of claim 33, further comprising:
requesting the second UE to send data instead of the UCI on the allocated resources; and
receiving data on the allocated resources from the second UE.

36. The method of claim 31, wherein the processing the data transmission comprises:
generating a first waveform based on the UCI, and
canceling the first waveform from a received signal at the first base station to obtain a modified signal comprising the data transmission from the first UE.

37. The method of claim 31, further comprising:
sending a UCI associated with the first UE from the first base station to a second base station, and wherein interference cause by the data transmission from the first UE is canceled by the second base station based on the UCI associated with the first UE.

38. An apparatus for wireless communication, comprising:
means for receiving a data transmission from a first user equipment (UE) at a first base station over uplink resources allocated by the first base station to the first UE, the first UE being served by the first base station;

means for receiving, at the first base station from a second UE, uplink control information (UCI) associated with the second UE over UCI resources allocated between the second UE and the first base station, wherein the second UE is not being served by the first base station, and wherein the UCI includes a reverse rate indicator that indicates a rate selected by the second UE;

means for performing, at the first base station based on the UCI, interference cancellation of a second data transmission sent from the second UE; and means for processing, at the first base station, the data transmission after performing the interference cancellation.

39. The apparatus of claim 38 wherein the UCI is generated by the second UE based on second uplink resources allocated to the second UE in an uplink grant.

40. The apparatus of claim 38, further comprising:
means for sending a UCI associated with the first UE from the first base station to a second base station, and wherein interference cause by the data transmission from the first UE is canceled by the second base station based on the UCI associated with the first UE.

* * * * *